United States Patent
Okubo

(10) Patent No.: US 11,122,226 B2
(45) Date of Patent: Sep. 14, 2021

(54) IMAGING APPARATUS AND CONTROL METHOD THEREOF

(71) Applicant: CANON KABUSHIKI KAISHA, Tokyo (JP)

(72) Inventor: Toshiyuki Okubo, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/461,057

(22) PCT Filed: Nov. 13, 2017

(86) PCT No.: PCT/JP2017/040801
§ 371 (c)(1),
(2) Date: May 15, 2019

(87) PCT Pub. No.: WO2018/092731
PCT Pub. Date: May 24, 2018

(65) Prior Publication Data
US 2019/0268544 A1    Aug. 29, 2019

(30) Foreign Application Priority Data
Nov. 17, 2016 (JP) .............................. JP2016-224203

(51) Int. Cl.
*H04N 5/369* (2011.01)
*H04N 5/232* (2006.01)

(52) U.S. Cl.
CPC ... *H04N 5/36961* (2018.08); *H04N 5/232122* (2018.08); *H04N 5/23293* (2013.01)

(58) Field of Classification Search
None
See application file for complete search history.

(56) References Cited

U.S. PATENT DOCUMENTS 8,976,289 B2    3/2015    Iwasaki
9,124,807 B2    9/2015    Tsubaki
(Continued)

FOREIGN PATENT DOCUMENTS

CN    102870028 A    1/2013
CN    103037224 A    4/2013
(Continued)

OTHER PUBLICATIONS

International Search Report dated Feb. 26, 2018, in International Application No. PCT/JP2017/040801.
(Continued)

*Primary Examiner* — James M Hannett
(74) *Attorney, Agent, or Firm* — Venable LLP

(57) ABSTRACT

An imaging unit of an imaging apparatus comprises an imaging element having a plurality of photoelectric conversion units that converts an optical image of an object formed by an imaging optical system into an image signal. A focus detection unit reads out a plurality of image signals that has been pupil-split by the imaging element and performs focus detection. If an accumulation time of the imaging element or a signal-to-noise ratio of the image signal changes, a system control unit controls a readout line that obtains the image signals in a focus detection region with respect to the imaging unit to change the readout line of focus detection pixels in accordance with an accumulation time or a sensitivity setting of the imaging element. In a low shutter speed and a high sensitivity, the readout control of the image signal is performed by reducing the number of readout lines.

12 Claims, 11 Drawing Sheets

(56) References Cited

U.S. PATENT DOCUMENTS

| | | | |
|---|---|---|---|
| 9,426,350 B2 | 8/2016 | Konishi | |
| 9,451,150 B2 | 9/2016 | Shibagami | |
| 9,531,946 B2 | 12/2016 | Okubo | |
| 9,547,217 B2 | 1/2017 | Iwasaki | |
| 9,560,243 B2 | 1/2017 | Kawai | |
| 9,628,733 B2 | 4/2017 | Shimada | |
| 9,661,210 B2 | 5/2017 | Haneda | |
| 10,389,930 B2 | 8/2019 | Kato et al. | |
| 2010/0188522 A1* | 7/2010 | Ohnishi | H04N 5/23212 348/222.1 |
| 2012/0008122 A1* | 1/2012 | Iwai | G03B 27/53 355/55 |
| 2012/0281132 A1* | 11/2012 | Ogura | G06T 5/003 348/348 |
| 2014/0340565 A1 | 11/2014 | Kitani et al. | |
| 2015/0156428 A1 | 6/2015 | Uchida | |
| 2015/0215554 A1 | 7/2015 | Toyoguchi | |
| 2016/0227091 A1* | 8/2016 | Miura | H04N 5/2353 |
| 2017/0054905 A1* | 2/2017 | Iwasaki | H04N 5/23238 |

FOREIGN PATENT DOCUMENTS

| | | | |
|---|---|---|---|
| CN | 103888645 | | 6/2014 |
| CN | 103888692 A | | 6/2014 |
| CN | 103973999 A | | 8/2014 |
| CN | 104519276 A | | 4/2015 |
| CN | 104813213 A | | 7/2015 |
| CN | 104919789 A | | 9/2015 |
| CN | 105530427 A | | 4/2016 |
| EP | 2884737 A1 | | 6/2015 |
| EP | 2884737 A1 * | 6/2015 | ............... G02B 7/34 |
| JP | 2010-186137 A | | 8/2010 |
| JP | 2012-230172 A | | 11/2012 |
| JP | 2013-061582 A | | 4/2013 |
| JP | 2015-228466 A | | 12/2015 |
| JP | 2016-005189 A | | 1/2016 |
| JP | 2016-072695 A | | 5/2016 |
| WO | 2011/136031 A1 | | 11/2011 |

OTHER PUBLICATIONS

Office Action dated Jun. 30, 2020, in Japanese Patent Application No. 2016-224203.

Office Action dated Oct. 26, 2020, in Chinese Patent Application No. 201780071196.5.

Office Action dated Jun. 16, 2021, in Chinese Patent Application No. 201780071196.5.

* cited by examiner

[Fig. 1]
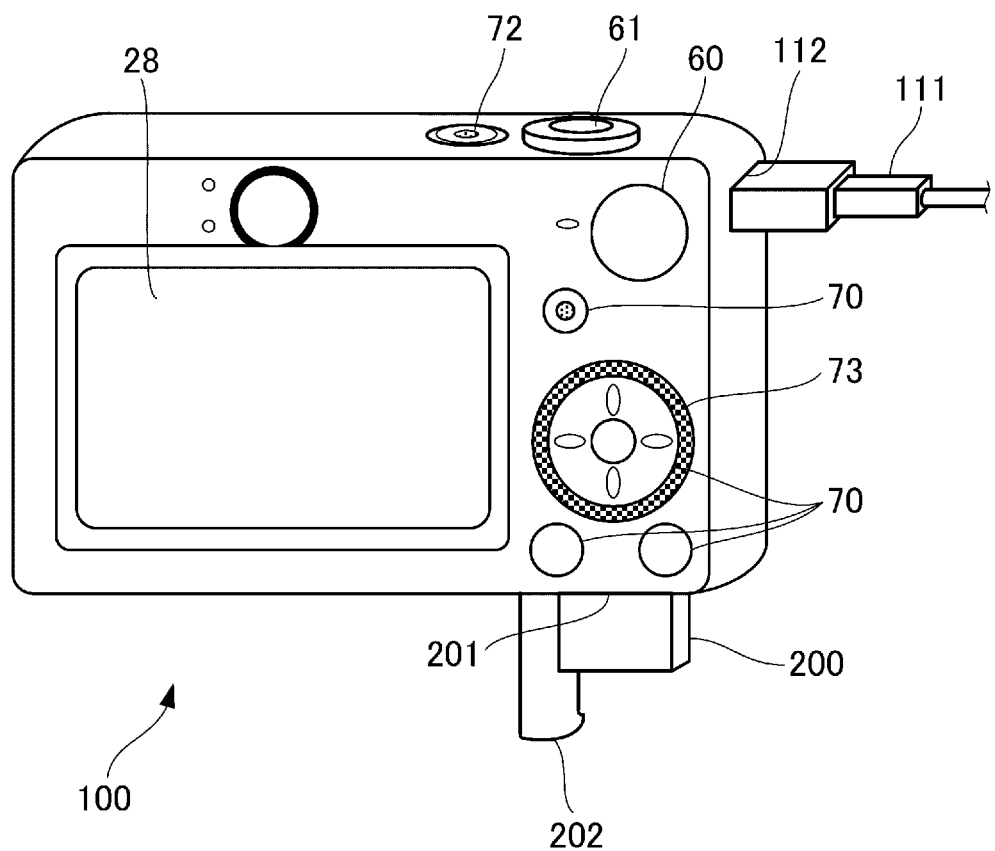

[Fig. 2]
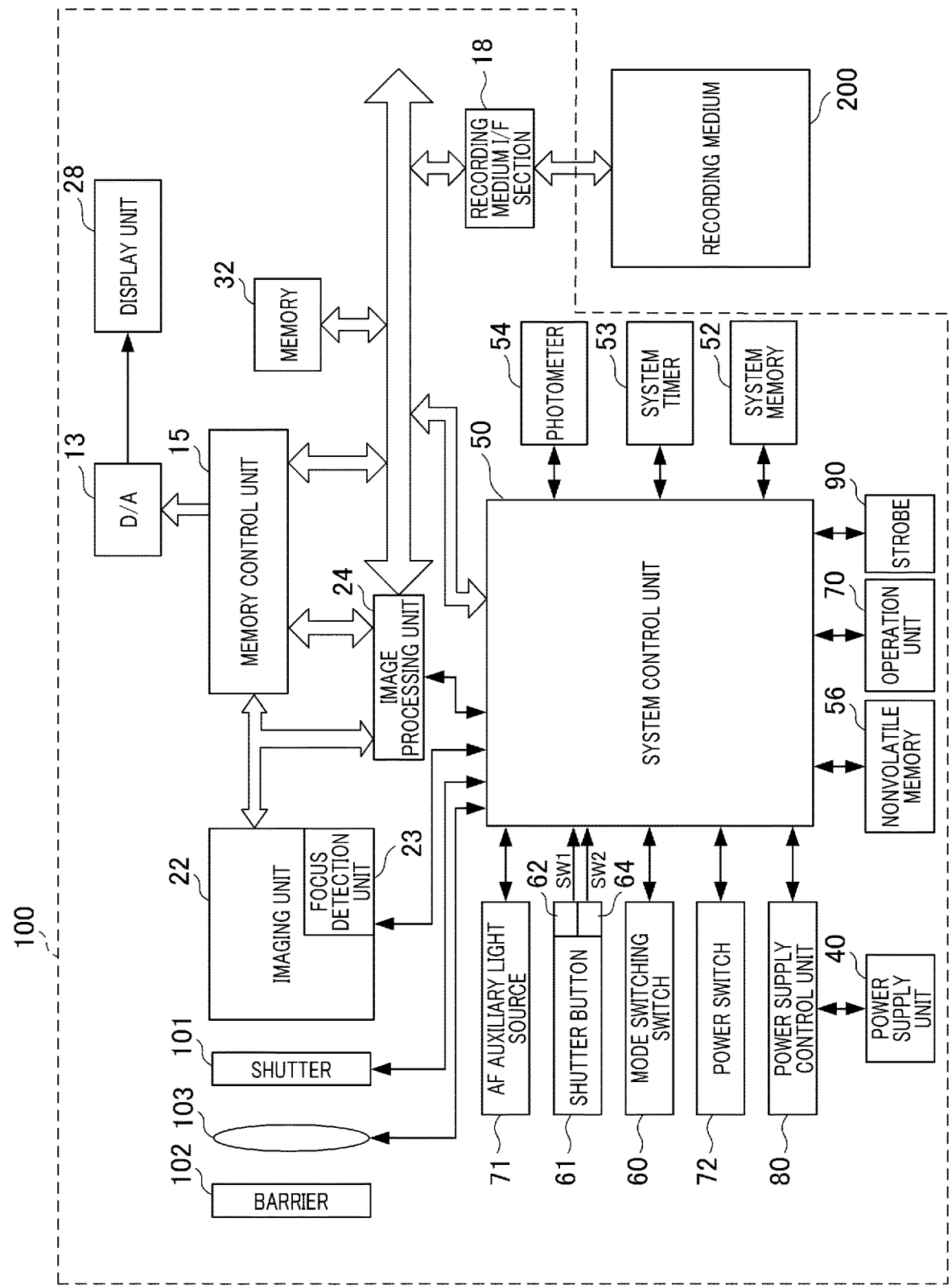

[Fig. 3]
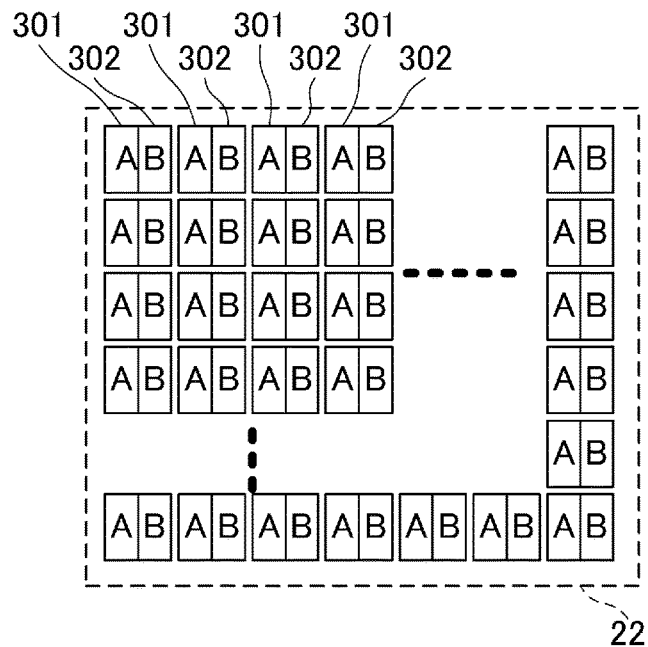
[Fig. 4]
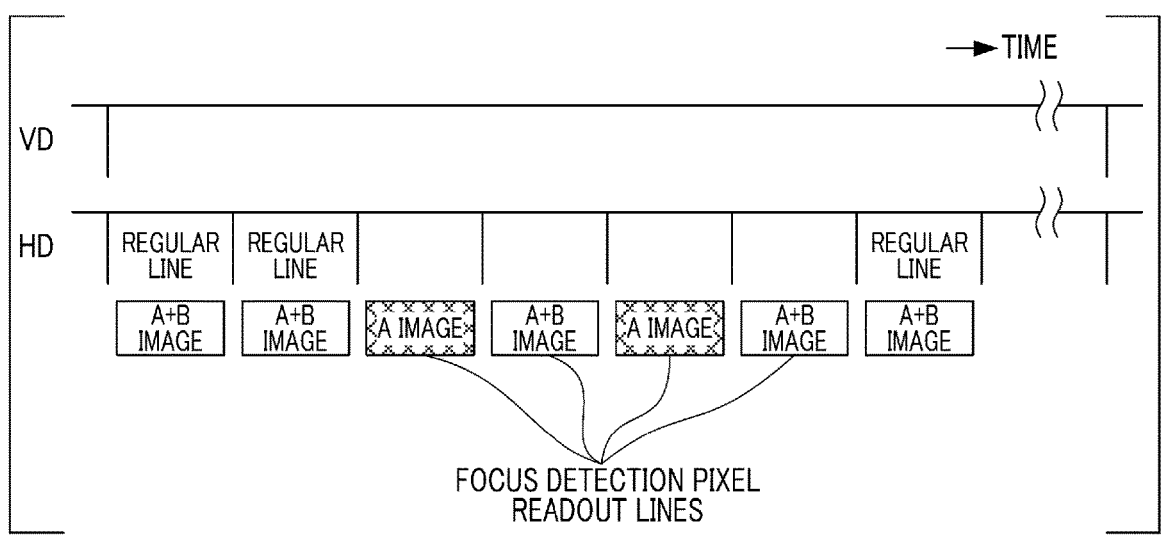

[Fig. 5]
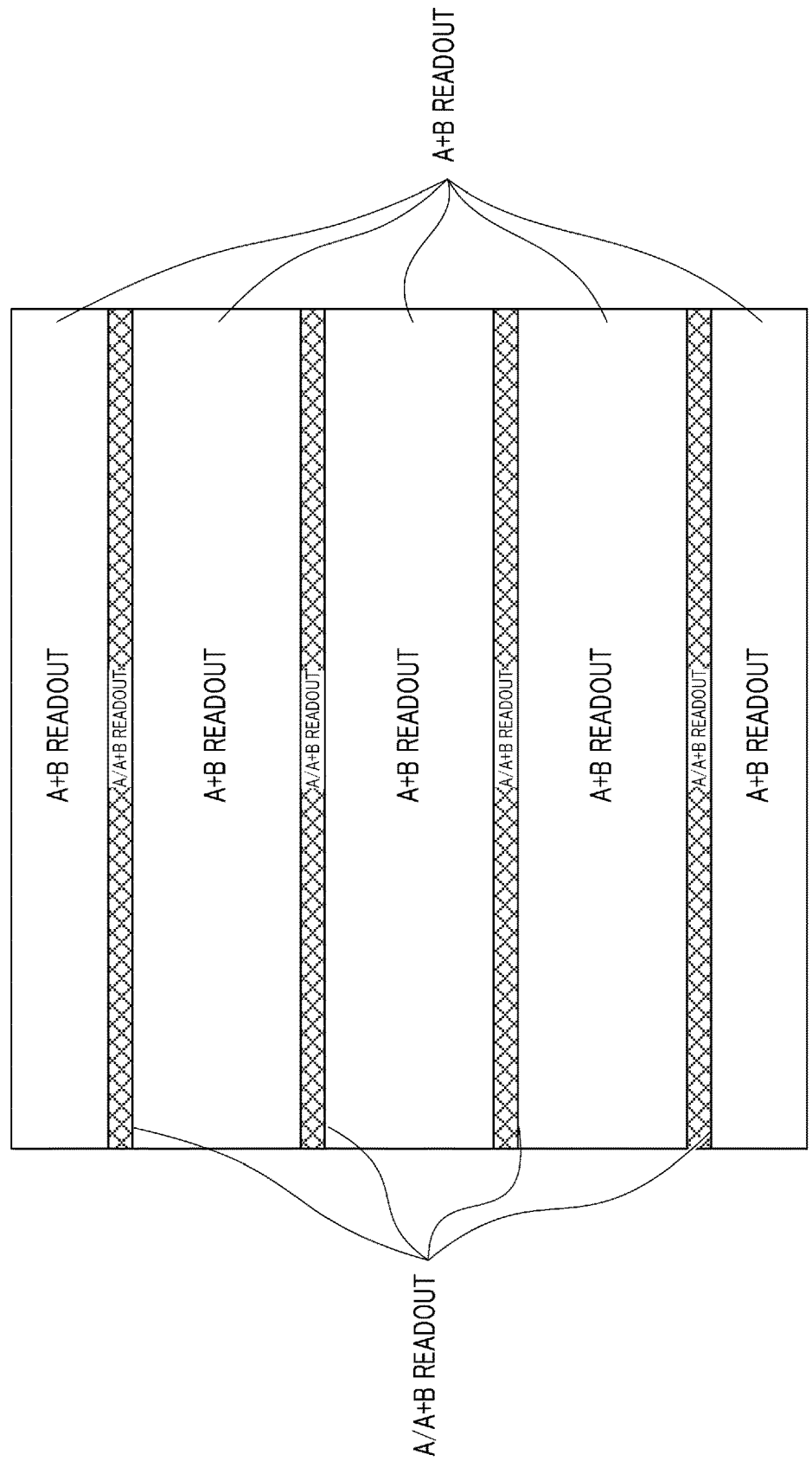

[Fig. 6]
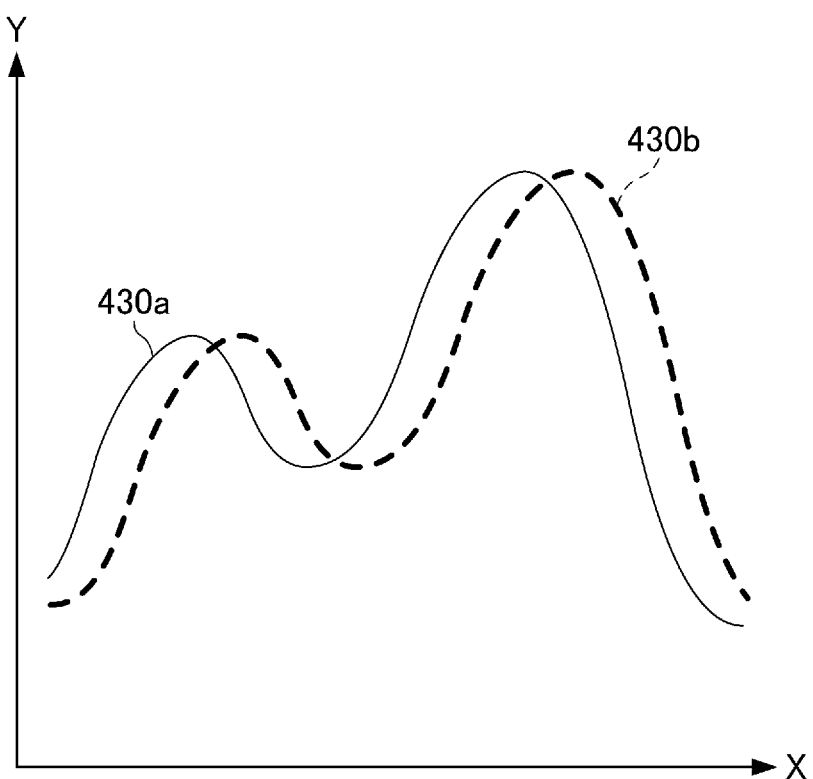

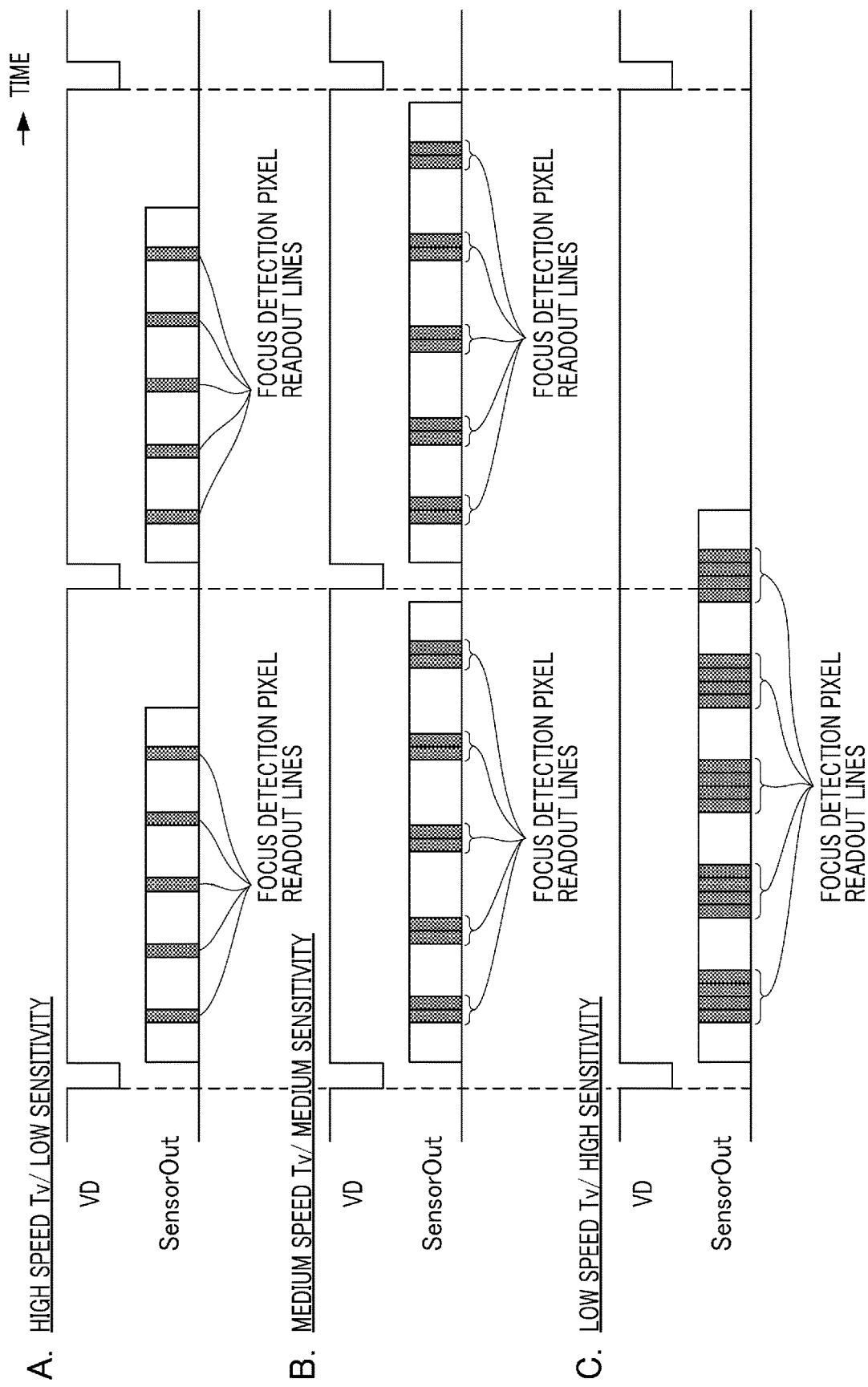
[Fig. 7]

[Fig. 8]
| Shutter speed | The number of readout lines |
|---|---|
| < 1/250 | Standard |
| < 1/60 | Standard × K1 |
| < 1/15 | Standard × K2 |
| ≧ 1/15 | Standard × K3 |
[Fig. 9]
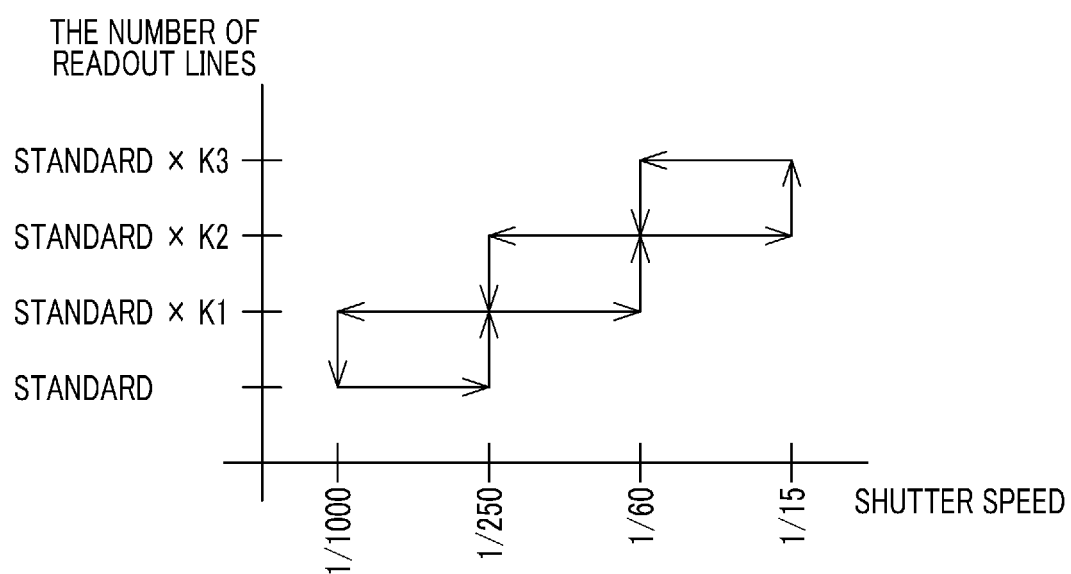

[Fig. 10]
| ISO sensitivity | The number of readout lines |
|---|---|
| < ISO1600 | Standard |
| < ISO3200 | Standard × K4 |
| < ISO6400 | Standard × K5 |
| ≧ ISO6400 | Standard × K6 |
[Fig. 11]
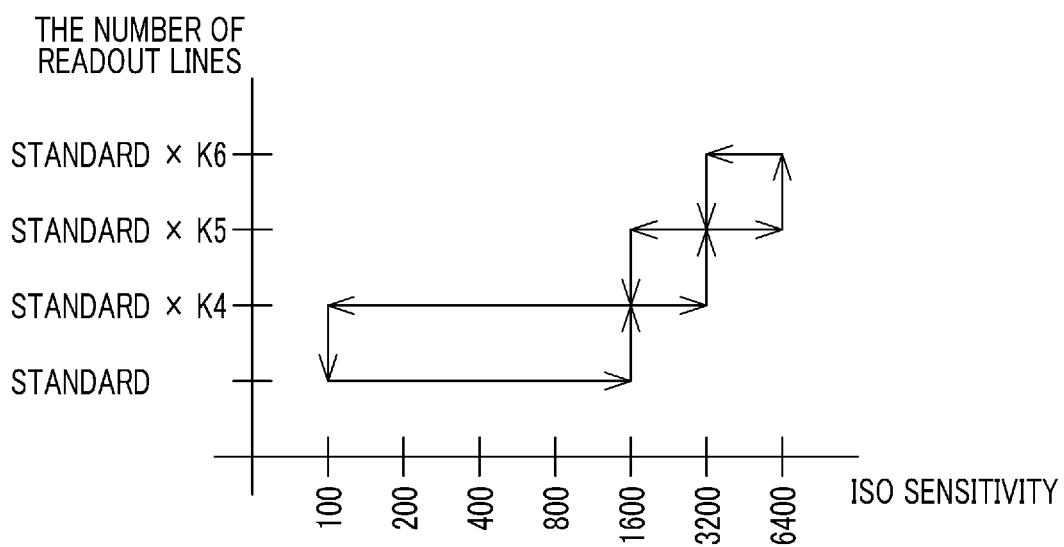

[Fig. 12]
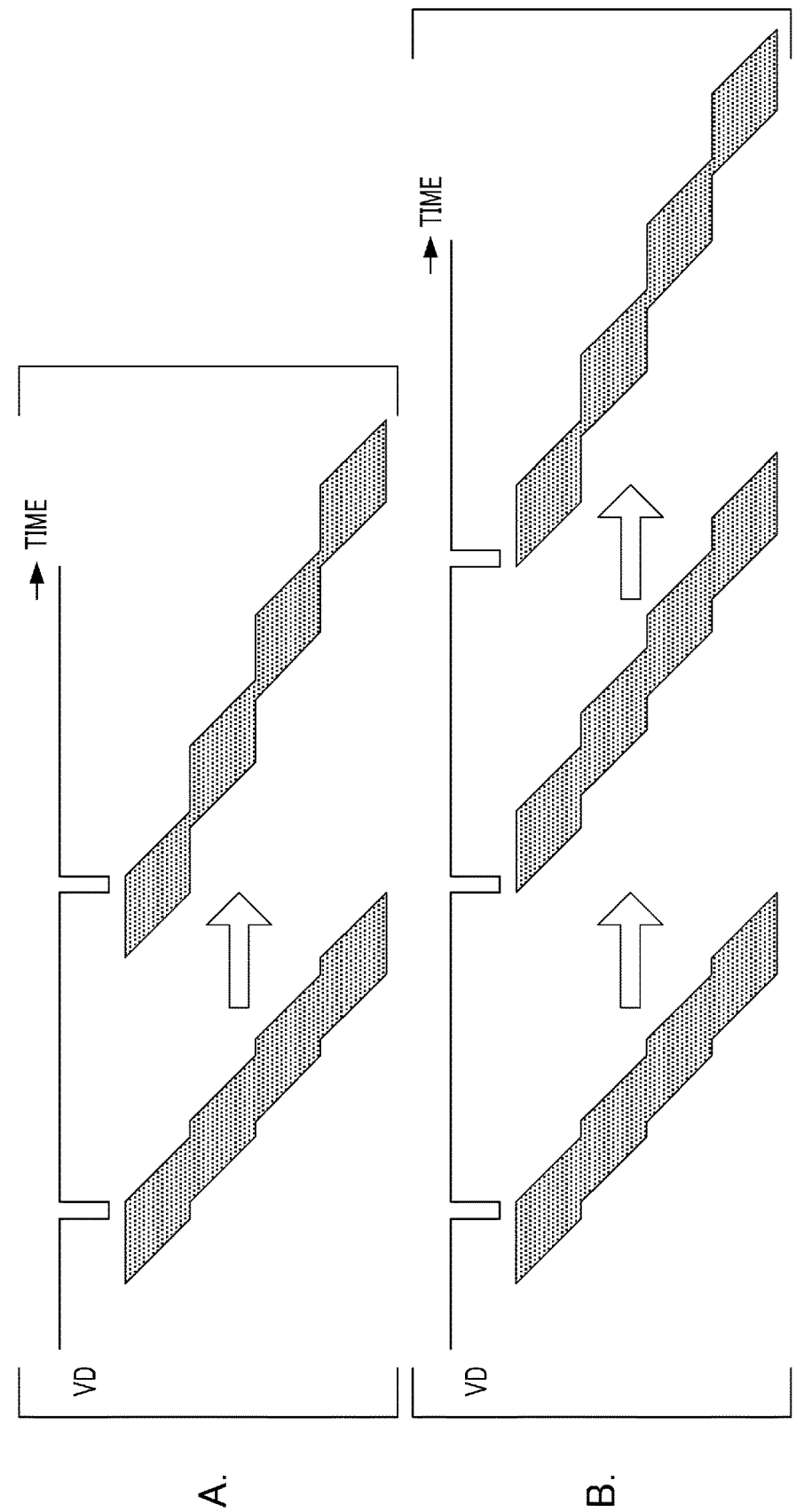

[Fig. 13]
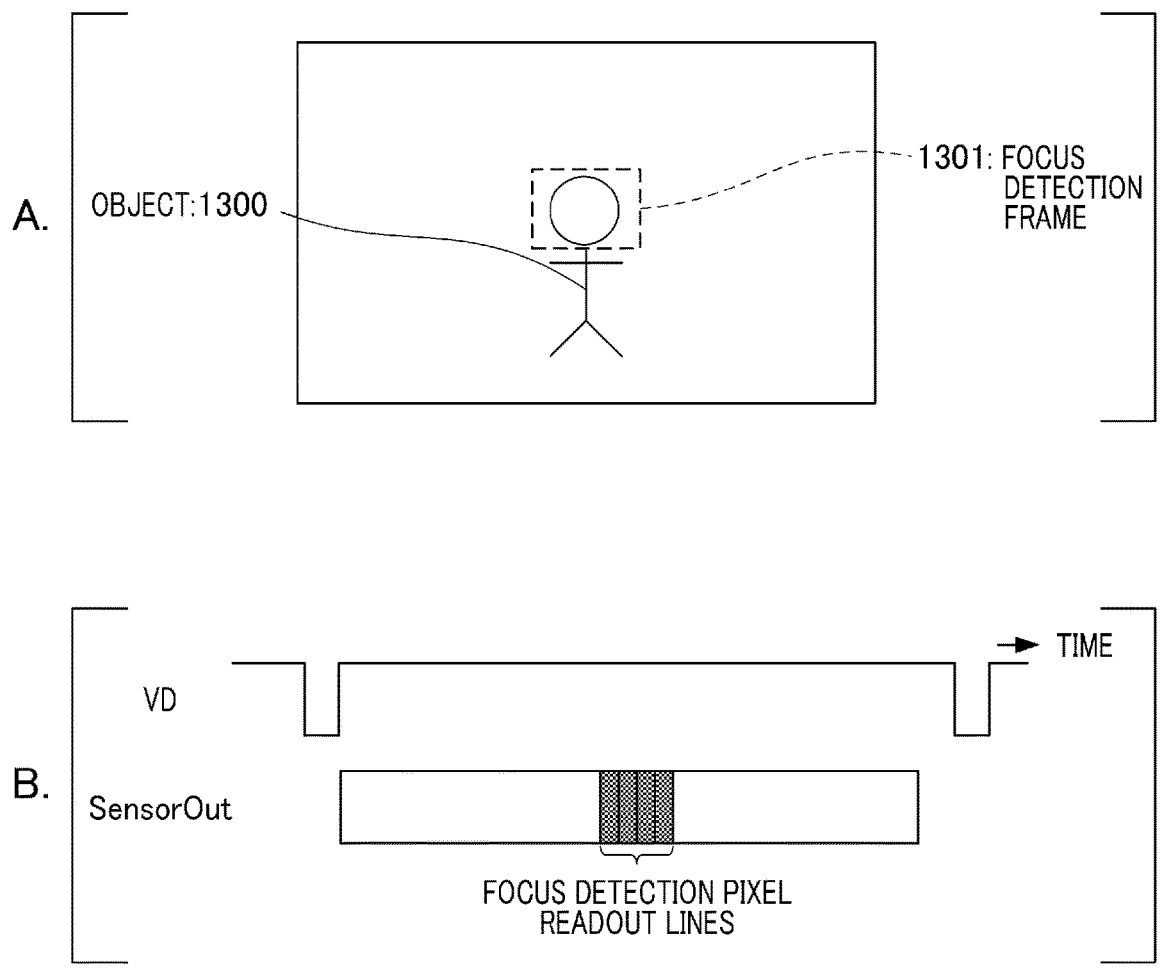

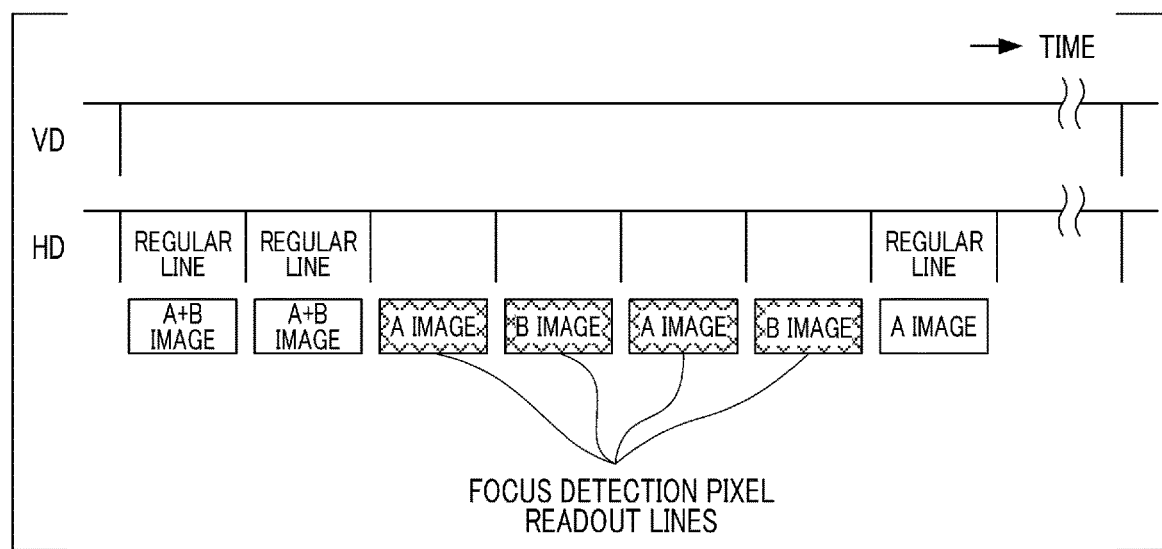
[Fig. 14]

IMAGING APPARATUS AND CONTROL METHOD THEREOF

TECHNICAL FIELD

The present invention relates to an imaging apparatus and a control method thereof.

BACKGROUND ART

An imaging apparatus such as a consumer-use camcorder or a digital still camera has an auto focus (hereinafter, also referred to as "AF") function, and thus, focus adjustment by a manual operation is unnecessary. Structurally, there are roughly two types of AF mechanisms using an imaging element. The first method is the contrast AF method in which an output of an imaging pixel is processed, an evaluation value is calculated, and a drive of a focus lens is performed. Although this method is a simple configuration, it takes a long time to complete the process. The second method is the phase difference detection method. There is the image plane phase-difference detection AF method in which a defocus amount is calculated based on an output phase difference of pixels for focus detection in a pupil division imaging element and a drive of the focus lens is performed. In this method, since the defocus amount is obtained from the image data of one frame, there is an advantage in which a detection time is very short. In the Patent Literature 1, a method is proposed in which pixels for focus detection and pixels for display and recording are shared.

CITATION LIST

Patent Literature

Patent Literature 1: Japanese Patent Application Laid-Open Publication No. 2012-230172

In the imaging element disclosed in the Patent Literature 1, data of pixels for display and recording is read out after data of pixels for focus detection has been read out. Hence, if the time required for readout takes a long time, a problem is caused in which a readout frame-rate and a continuous shooting speed of the imaging element decrease and power consumption increases.

SUMMARY OF INVENTION

The present invention is to suppress deterioration of focus detection accuracy and an increase in power consumption.

An imaging apparatus according to an embodiment of the present invention comprises an imaging element configured to have a plurality of photoelectric conversion units that converts an optical image of an object formed by an imaging optical system into an image signal; a focus detection unit configured to read out a plurality of image signals that has been pupil-split by the imaging element and perform focus detection; and a control unit configured to perform control in which a readout line that obtains the image signals in a region where the focus detection unit performs focus detection is changed and perform control of focus adjustment of the imaging optical system by using the image signal obtained from the readout line if an accumulation time of the imaging element or a signal-to-noise ratio of the image signal changes.

According to the imaging apparatus of the present invention, it is possible to suppress deterioration of focus detection accuracy and an increase in power consumption.

Further features of the present invention will be explained from the following description of the following description with reference to the attached drawings.

BRIEF DESCRIPTION OF DRAWINGS

FIG. 1 is an external view of an imaging apparatus according to the present embodiment.

FIG. 2 is a block diagram illustrating a system configuration of the imaging apparatus according to the present embodiment.

FIG. 3 is a schematic diagram illustrating a pixel arrangement of the imaging apparatus.

FIG. 4 illustrates a readout timing of the imaging element according to the first embodiment.

FIG. 5 illustrates partial readout of a focus detection image.

FIG. 6 is an explanatory diagram related to the calculation of the imaging surface phase difference AF.

FIG. 7 illustrates the switching of readout lines of the focus detection image.

FIG. 8 is a table illustrating a threshold value of the shutter speed for switching the number of readout lines.

FIG. 9 is an explanatory diagram of the hysteresis of a switching control corresponding to FIG. 8.

FIG. 10 is a table illustrating a sensitivity threshold value for switching the number of readout lines.

FIG. 11 is an explanatory diagram of the hysteresis of the switching control corresponding to FIG. 10.

FIG. 12 illustrates the restriction on the change of the number of readout lines.

FIG. 13 illustrates the readout of focus detection pixels when an object is detected.

FIG. 14 illustrates a readout timing of the imaging element according to the second embodiment.

DESCRIPTION OF EMBODIMENTS

Hereinafter, preferred embodiments of the present invention will be described with reference to the drawings.

First Embodiment

FIG. 1 illustrates an external view of a digital camera as an example of an imaging apparatus according to the first embodiment of the present invention. In the description below, the positional relation between each part will be described by defining each direction of up, down, right, and left as viewed from the object, with the object side being defined as the front side. An imaging apparatus 100 includes a display unit 28 on the back surface of the body. The display unit 28 displays captured images and a variety of information on the screen.

The imaging apparatus 100 includes operation units 70 on the top surface and the back surface of the body. The operation unit 70 includes operation members such as various switches, buttons, and a touch panel that receive various operations from the user. A mode switching switch 60 is an operation member for switching various modes, and is arranged on the back surface of the body. A shutter button 61 is an operation member for providing a shooting instruction, and is arranged on the top surface of the body. A power switch 72 is an operation member for switching between the ON state and the OFF state of a power supply, and is arranged on the top surface of the body. A controller wheel 73 is a rotatable operation member included in the operation unit 70, and is arranged on the back surface of the body. A connector 112 is a member that connects a connection cable 111 and the imaging apparatus 100. A recording medium 200 is a recording medium such as a memory card and a hard disk. The recording medium 200 is stored in the body via a recording medium slot 201, and the recording medium 200 in a stored state can communicate with the imaging apparatus 100. A lid 203 is an opening and closing lid of the recording medium slot 201.

FIG. 2 is a block diagram illustrating a configuration example of the imaging apparatus 100. A shooting lens 103 is a lens group including a zoom lens and a focus lens. A shutter 101 is a shutter also serving as a diaphragm having an aperture function. An imaging unit 22 includes an imaging element that photoelectrically converts an optical image of the object formed by an imaging optical system into an electric signal, and a focus detection unit 23. The imaging element is a CCD (Charge Coupled Device) image sensor, a CMOS (Complementary Metal Oxide Semiconductor) image sensor, and the like. Additionally, the imaging unit 22 includes an A (analog)/D (digital) conversion processing unit. The focus detection unit 23 performs focus detection based on the image signal after imaging by using the imaging surface phase difference detection method. The focus detection information is output from the imaging unit 22 to a system control unit 50. A barrier 102 covers structural members of the imaging optical system including the shooting lens 103, thereby preventing contamination and damage of the shooting lens 103, the shutter 101, and the imaging unit 22.

An image processing unit 24 performs a predetermined image process on data output from the imaging unit 22 or data from a memory control unit 15. The predetermined image process includes, for example, pixel interpolation, a resizing process such as reduction, and a color conversion process. Additionally, the image processing unit 24 performs a predetermined calculation process using the captured image data, and outputs the calculation result to the system control unit 50. The system control unit 50 performs an exposure control, a focus detection control, and a focus adjustment control based on the obtained calculation result. Thus, an AE (automatic exposure) process of the TTL (through-the-lens) method are performed and an EF (flash automatic light emission) process. Additionally, the image processing unit 24 also performs a contrast AF process, and at this time, the output of the focus detection unit 23 of the imaging unit 22 may also be used. The image processing unit 24 further performs a predetermined calculation process using the captured image data and performs a TTL AWB (auto white balance) process based on the obtained calculation result.

The output data of the imaging unit 22 is written into a memory 32 via the image processing unit 24 and the memory control unit 15, or via the memory control unit 15. The memory 32 stores image data that has been obtained by the imaging unit 22 and on which A/D conversion has been performed, and image data to be displayed on the display unit 28. The memory 32 has a sufficient storage capacity for storing a predetermined number of still images, a predetermined time of a moving image and sound. Additionally, the memory 32 also serves as an image display memory (video memory).

A D/A conversion unit 13 converts the image display data stored in the memory 32 into an analog signal and outputs it to the display unit 28. The display image data written in the memory 32 is displayed on the screen of the display unit 28 via the D/A conversion unit 13 after readout. The display unit 28 includes a display device such as an LCD (liquid crystal display device), and performs image display in response to an analog signal output from the D/A conversion unit 13. The digital signal stored in the memory 32 after A/D-converted one time by the imaging unit 22 is converted into an analog signal by the D/A conversion unit 13, transferred sequentially to the display unit 28, and an image is displayed. Hence, a function as an electronic viewfinder is realized and an image through-the-lens is displayed.

A nonvolatile memory 56 is a memory that can be electrically erased and recorded, for example, a flash memory and the like are used. Constants, programs, and the like for operation of the system control unit 50 are stored in the nonvolatile memory 56. The program referred to here is a program for executing a process described in the present embodiment.

The system control unit 50 controls the entire imaging apparatus 100. The system control unit 50 realizes each process of the present embodiment by reading out and executing the program recorded in the nonvolatile memory 56. A system memory 52 is a RAM (random access memory), and stores constants and variables for operation of the system control unit 50, programs read out from the nonvolatile memory 56, and the like. Additionally, the system control unit 50 performs a display control by controlling the memory 32, the D/A conversion unit 13, the display unit 28, and the like. A system timer 53 is a timing unit that measures the time used for various controls and the time of a built-in clock. A photometer 54 includes a photometric sensor, detects luminance information of the object, and outputs the information to the system control unit 50. Note that, if photometry is performed based on the light received by the imaging element (at the time of a live view mode and the like), an object luminance can be detected by dividing the inside of the shooting screen into a plurality of partial regions and performing a photometry process.

The user can perform an operation of inputting various operation instructions to the system control unit 50 by using the mode switching switch 60, a first shutter switch 62, a second shutter switch 64, and the operation unit 70. The operation mode of the system control unit 50 is switched to a still image recording mode, a moving image recording mode, a reproduction mode, and the like by the mode switching switch 60.

The first shutter switch 62 is turned on in the middle of operation of the shutter button 61 provided in the imaging apparatus 100, that is, referred to as a "half-pressing operation (operation of shooting preparation instruction)", and generates a first shutter switch signal SW 1. Operations such as an AF process, an AE process, an AWB process, an EF process, and the like start by the first shutter switch signal SW 1. The second shutter switch 64 is turned on by the completion of the operation of the shutter button 61, that is, referred to as a "complete-pressing operation (operation of the shooting instruction)", and generates a second shutter switch signal SW 2. Upon receipt of the second shutter switch signal SW 2, the system control unit 50 starts a series of shooting operations from the readout of the signal of the imaging unit 22 to the writing of the image data on the recording medium 200.

Appropriate functions are assigned to each operation member of the operation unit 70 for each screen scene by, for example, selecting and operating various function icons displayed on the screen of the display unit 28. For example, there are various function buttons such as an end button and a jump button. While watching the menu screen displayed on the display unit 28, the user can perform various settings using the four direction buttons of up, down, right, and left, and a SET button.

An AF auxiliary light source 71 illuminates the object by emitting lights in a low luminance state. The controller wheel 73 is a rotatable operation member included in the operation unit 70, and is used, for example, if the user provides an instruction of a selection item together with a direction button. If the controller wheel 73 is rotated, an electrical pulse signal is generated in accordance with the operation amount, and the system control unit 50 controls each unit of the imaging apparatus 100 based on this pulse signal. Note that the controller wheel 73 is a dial operating member that generates a pulse signal in response to the rotating operation by the user, or a touch wheel that detects the rotational operation and the like of the user's finger on the controller wheel 73 by a contact detecting unit.

A power supply control unit 80 includes a battery detection circuit, a DC-DC converter, a switch circuit that switches blocks to be charged, and performs detection of whether or not a battery is installed, the type of the battery, and the battery remaining amount. Additionally, the power source control unit 80 controls the DC-DC converter based on the detected result and a control instruction provided from the system control unit 50, and supplies it to each unit including the recording medium 200 at appropriate time. The power supply unit 40 is composed of a primary battery or a secondary battery, an AC adapter, and the like. The recording medium I/F section 18 is an interface section with a recording medium 200 such as a memory card and a hard disk. The recording medium 200 is a recording medium such as a memory card that records image data and the like, and is configured by a semiconductor memory, a magnetic disk, and the like. A strobe 90 emits lights in accordance with a control signal from the system control unit 50 and irradiates the object.

Next, referring to FIG. 3, the pixel arrangement of the imaging element will be described. The imaging element is configured by a plurality of pixel portions. Each pixel portion includes a microlens and a plurality of divided photoelectric conversion portions corresponding to each of the microlenses, and can obtain pupil-split image signals. In the present embodiment, a first pixel and a second pixel serve as a two division photoelectric conversion section, where the first pixel is defined as the A pixel 301 and the second pixel is defined as a B pixel 302. The signals of the A pixel 301 and the B pixel 302 are read out and focus detection calculation is performed based on the horizontal phase difference between the image signal of the A pixel and the image signal of the B pixel. Regarding the reading order, a process that reads out the image signal of the B pixel is performed after the readout of the A pixel, without resetting the electric charge of the A pixel. Specifically, the addition of the A pixel and the B pixel is performed in the FD (floating diffusion) portion in the imaging element, and the added image signal of the A pixel and the B pixel is read out. Hereinafter, the image signal of the A pixel is referred to as an "A image signal", and the image signal of the B pixel is referred to as a "B image signal". The added image signal of the A pixel and the B pixel in the imaging element is referred to as an "A+B image signal".

An image obtained from the A+B image signal can be used as it is as a display and recording image. It is possible to suppress deterioration due to noise and perform pixel addition by performing charge addition in the FD section. The B image signal is obtained by subtracting the A image signal from the A+B image signal as shown in the following formula (1).

$$B \text{ image signal} = A+B \text{ image signal} - A \text{ image signal} \quad (1)$$

Next, with reference to FIG. 4, the readout timing of the imaging element will be described. "VD" in the drawing represents a vertical synchronizing signal and "HD" represents a horizontal synchronizing signal. A reference signal indicating a start of frame readout is obtained in synchronism with VD, and signal readout of pixels is performed for each line in synchronization with HD. A regular line is a readout line of the captured image and the readout line of the focus detection image is a readout line of a plurality of signals to be used for focus detection. In this case, the plurality of signals are the A image signal and the A+B image signal.

During the HD time period, the A+B image signal is read out in the regular line. Additionally, in the readout line of the focus detection pixels, the A image signal is output first, and the A+B image signal is continuously output from the time point when the readout of all the horizontal pixels has completed. The signal read out of the focus detection pixels is performed while signals on designated lines are being read out. If the signal readout on the designated line has completed, the process returns to the signal readout for the regular line, and the signal readout of the entire screen is performed. Note that, in the present embodiment, an example has been described in which signals of all the horizontal pixels are read out with respect to the A image signal read out from the focus detection pixel. However, a configuration may be adopted in which only signals of the object region and a part of image surrounding the object are read out.

The image signals read out from the imaging unit 22 and the focus detection unit 23 are processed by the image processing unit 24, and the A image signal is subtracted from the A+B image signal to generate the B image signal. As a result, the A image signal and the B image signal to be used for the focus detection process are generated. The A+B image signal read out from the imaging unit 22 is used as a display and recording image signal.

FIG. 5 illustrates a partial readout of the focus detection image. Regarding the line that obtains the focus detection image data, the number of samples is large if image data is obtained from all lines, and is thereby ideal from the viewpoint of focus detection accuracy. However, in the method of obtaining the image data in all the lines, the readout time from the imaging unit 22 is long, the frame rate lowers, the continuous shooting speed lowers, and the power consumption increases. Therefore, it is desirable to read out the focus detection image data at the minimum necessary amount, so a partial reading is performed.

In FIG. 5, the lines labeled "A/A+B independent readout" in the shot image are lines that obtain the captured image and the focus detection image. The lines other than these labeled "A+B readout" are lines that perform addition of the A image signal and the B image signal in the imaging element and then output the signal, without reading out only the A image. Which line among the lines is to be "A/A+B independent readout" is determined based on the user setting and the object detection result. In the present embodiment, it is assumed that the readout line is determined in accordance with the object luminance and the S/N ratio (signal-to-noise ratio) of the imaging element in the region to be detected after the target region for focus detection is determined. That is, if the accumulation time or the signal-to-noise ratio of the imaging element changes, the system control unit 50 performs control to change the readout line that obtains the A image signal and the A+B image signal in the focus detection region. The accumulation time of the imaging element is determined in accordance with the luminance of the object. Additionally, the value of the signal-to-noise ratio of the imaging element is calculated based on readout sensitivity or a temperature of the imaging element.

FIG. 6 is an explanatory diagram concerning the calculation of the imaging surface phase difference AF. A pair of focus detection signals that are photoelectrically converted by the imaging element, which has undergone various corrections by the image processing unit 24 and are then transmitted to the focus detection section 23, are shown. The horizontal axis X in FIG. 6 represents the position of the connected signal in the pixel arrangement direction, and the vertical axis Y represents the intensity of the signal. A focus detection signal 430*a* shown by the solid graph line and a focus detection signal 430*b* shown by the dotted graph line are signals formed by each of the A image and the B image that are focus detection images.

If the shooting lens 103 is in a defocus state with respect to the imaging element, the focus detection signal 430*a* in FIG. 6 is positioned on the left side and the focus detection signal 430*b* in FIG. 6 is positioned on the right side so that both signals are shifted. The focus detection unit 23 calculates the shift amount between the focus detection signals 430*a* and 430*b* by using correlation calculation and the like, and detects a degree of the defocus state of the shooting lens 103. The system control unit 50 obtains the signals of the lens position information of the shooting lens 103 and the defocus amount obtained from the focus detection unit 23, and calculates a drive amount of the focus lens. Subsequently, the system control unit 50 refers to the position information of the focus lens, transmits a control signal that depends on the information about the position to which the focus lens is to be driven to the shooting lens 103, and performs control of focusing of the shooting lens 103.

FIG. 7 illustrates a switching control of lines that reads out focus detection images. VD represents a vertical synchronization signal, and SensorOut represents the output of the imaging element. The system control unit 50 performs control in which the readout lines of the focus detection image is changed if the exposure time or the sensitivity setting of the imaging element changes. The exposure time of the imaging element depends on to the shutter speed.

FIG. 7A illustrates a case of a high shutter speed and a low sensitivity, FIG. 7B illustrates a case of a medium shutter speed and a medium sensitivity, and FIG. 7C illustrates a case of a low shutter speed and a high sensitivity. The readout lines of the focus detection pixels shown in gray in FIG. 7 indicate the position of the imaging element in the output as a whole. In this example, if the focus detection information of the entire screen is required in a state in which a main object is not determined, the readout arrangement of the focus detection pixels is set that can cover the entire screen. The number of readout lines of the focus detection pixels is small in FIG. 7A and is large in FIG. 7C.

In a line that reads out a signal from the focus detection pixel, since the signal readout period of time is longer than usual, a minute step due to rolling distortion (rolling shutter distortion) occurs. Accordingly, if the shutter speed is high, as shown in FIG. 7A, the step becomes less conspicuous by reducing the number of readout lines of the focus detection pixels. Additionally, since the S/N ratio of the imaging element is high at the time of low sensitivity, a problem is not caused in focus detection accuracy even if the number of readout lines of the focus detection pixels is small. Details of the change of the number of readout lines in response to the shutter speed and sensitivity will be described below.

If the object luminance decreases and the shutter speed is reduced, the influence of rolling distortion decreases, and as a result, the S/N ratio of focus detection decreases. Accordingly, control is performed so as to increase the number of readout lines of the focus detection pixels (FIG. 7B). If the number of readout lines of the focus detection pixels is increased, the vertical blanking period of time is shortened, and the standby period of time of the imaging element is shortened. Additionally, since the S/N ratio decreases also by increasing the sensitivity, control that increases the number of readout lines of the focus detection pixels is performed in accordance with the increase in sensitivity.

As shown in FIG. 7C, if the shutter speed is further reduced or the sensitivity is further increased, it is necessary to further increase the number of readout lines of the focus detection pixels. For this reason, control that extends a process time including the frame period of time is performed. In a moving image, the frame rate is specified so that control is performed that extends the frame period of time by many times (integer multiple) from the reference frame rate. In the live view mode in which the captured images are sequentially displayed, the frame rate can be freely selected so that the frame period of time is set so as to encompass a readout time corresponding to the increased number of readout lines.

FIG. 8 exemplifies threshold values if the number of readout lines of the focus detection pixels is switched to the shutter speed. The threshold values of the shutter speed are set to $\frac{1}{250}$, $\frac{1}{60}$, and $\frac{1}{15}$ (second). In the range of the shutter speed faster than $\frac{1}{250}$, the number of readout lines of "standard" lines is set, which is defined as the minimum necessary standard number of readout lines. As the shutter speed decreases, the number of readout lines of the focus detection pixels increases, and a "standard" number of readout lines is multiplied by the coefficients (K1, K2, and K3). It is assumed that the relation of "K1<K2<K3" is satisfied.

Since the S/N ratio of the focus detection changes in accordance with the object luminance, in a high luminance object, the number of readout lines of the focus detection pixels may be small. In a low luminance object, it is necessary to increase the S/N ratio of focus detection by reading out signals from more focus detection pixels and performing the addition. Specifically, the focus detection unit 23 or the image processing unit 24 perform a process of adding the signals read out from the focus detection pixels in adjacent lines in the vertical direction of the screen. The object luminance is determined from the shutter speed, so that the influence on the rolling distortion can also be reduced.

In the present embodiment, a standard number of readout lines is set with respect to a high luminance object with a high shutter speed. In the specific example of FIG. 8, if the shutter speed is faster than $\frac{1}{250}$, the number of readout lines is set to "standard" number of lines. If the shutter speed decreases and the object luminance decreases, the setting is changed so as to increase the number of readout lines of the focus detection pixels. In the range of shutter speed of $\frac{1}{250}$ or slower than $\frac{1}{250}$ and faster than $\frac{1}{60}$, the number of readout lines obtained by multiplying the "standard" number of readout lines by the coefficient K1 is set. If the shutter speed further decreases and the object luminance further decreases, the setting is changed to further increase the number of readout lines. In the range of shutter speed of $\frac{1}{60}$ or slower than 1/60 and faster than 1/15, the number of readout lines obtained by multiplying the "standard" number of readout lines by the coefficient K2 is set. In the range of the shutter speed of 1/15 or slower than 1/15, the number of readout lines obtained by multiplying the "standard" number of the readout lines by the coefficient K3 is set.

FIG. 9 illustrates hysteresis characteristics if the number of readout lines of the focus detection pixels is switched in accordance with the shutter speed. The horizontal axis represents a shutter speed, and the vertical axis represents the number of readout lines. FIG. 9 illustrates an example corresponding to the setting of FIG. 8. In the range of the shutter speed from 1/1000 to 1/250, the "standard" number of readout lines is set. Moreover, if the shutter speed decreases in the range from 1/250 to 1/60, the "standard×K1" number of readout lines is set. If the shutter speed decreases in the range from 1/60 to 1/15, the "standard×K2" number of readout lines is set.

As shown in FIG. 8, if the number of readout lines of the focus detection pixels is switched in accordance with the shutter speed, there is a probability that a difference in rolling distortion occurs in the display and recording image. Accordingly, once the number of readout lines is switched, the difference in rolling distortion becomes less conspicuous if the number of readout lines is not changed afterwards as much as possible. In the present embodiment, hysteresis characteristics are provided in the switching control of the number of readout lines. In FIG. 9, the number of readout lines at the first stage is changed at the position where the shutter speed is changed from 1/1000 to 1/250 so that the "standard×K1" number of lines is set. Here, even if the shutter speed slightly increases or slightly decreases, the change in the number of readout lines due to the hysteresis characteristics does not occur. The change in the number of readout lines next time occurs when the shutter speed is 1/60. The final change in the number of readout lines occurs when the shutter speed is 1/15. By performing such a switching control having hysteresis characteristics, frequent changes in the number of readout lines do not occur even if a minute change in the shutter speed occurs. Therefore, it is possible to obtain the effect that the difference in rolling distortion becomes less conspicuous in the display and recording images.

FIG. 10 illustrates a sensitivity threshold if the number of readout lines of the focus detection pixels is switched in response to the ISO sensitivity. The sensitivity thresholds are ISO 1600, 3200, and 6400. In the range of sensitivity lower than ISO 1600, the "standard" number of readout lines is set, which is defined as the minimum necessary standard number readout lines. As the ISO sensitivity increases, the number of readout lines of the focus detection pixels increases, and the "standard" number of readout lines is multiplied by coefficients (K4, K5, or K6). It is assumed that the relation of "K4<K5<K6" is satisfied.

Since the S/N ratio of the focus detection varies in response to the sensitivity of the imaging element, the number of readout lines of the focus detection pixels may be small at the time of low sensitivity. However, at the time of high sensitivity, it is necessary to maintain the S/N ratio of focus detection constant by reading out signals from more focus detection pixels and performing the addition average in the vertical direction. A decrease in the S/N ratio of the focus detection can be determined based on the sensitivity setting of the imaging element.

In the present embodiment, during low sensitivity, the standard number of readout lines is set. In the specific example of FIG. 10, if the sensitivity is lower than ISO 1600, the number of readout lines is set to "standard". If the object luminance decreases and a high sensitivity is set, the setting is changed so as to increase the number of readout lines of the focus detection pixels. If the sensitivity is ISO 1600 or higher and lower than ISO 3200, the setting of maintaining the S/N ratio of the focus detection is performed by changing the number of readout lines to "standard×K4". If the object luminance further decreases and a higher sensitivity is set, the setting is changed so as to further increase the number of readout lines. If the sensitivity is ISO 3200 or higher and lower than ISO 6400, the setting of maintaining the S/N ratio of focus detection is performed by changing the number of readout lines to "standard×K5". If the sensitivity is ISO 6400 or higher, the number of readout lines is changed to "standard×K6".

FIG. 11 illustrates hysteresis characteristics if the number of readout lines of the focus detection pixels is switched in response to the ISO sensitivity. The horizontal axis represents the ISO sensitivity and the vertical axis represents the number of readout lines. FIG. 11 illustrates an example corresponding to the setting of FIG. 10, and in the range of sensitivity from ISO 100 to ISO 1600, the "standard" number of readout lines is set. In the range from ISO 1600 to ISO 3200 that is higher sensitivity, the "standard× K4"number of readout lines is set. In the range from ISO 3200 to ISO 6400 that is further higher sensitivity, the standard×K5" number of readout lines is set.

As shown in FIG. 10, if the number of readout lines of the focus detection pixel is switched in response to the ISO sensitivity, there is a probability that a difference in rolling distortion occurs in the display and the recording image. Hence, once the number of readout lines is switched, the difference in rolling distortion becomes less conspicuous if the number of readout lines is not changed afterwards as much as possible. Accordingly, hysteresis characteristics are provided in switching control of the number of readout lines. In FIG. 11, the number of readout lines at the first stage is changed if the ISO sensitivity changes from ISO100 to ISO1600, the "standard×K4" number of readout lines is set. Here, even if the ISO sensitivity slightly changes, the change in the number of readout lines does not occur due to the hysteresis characteristics. The change in the number of readout lines next time occurs when the sensitivity is ISO 3200. The final change in the number of readout lines occurs when the sensitivity is ISO 6400. By performing such a switching control having hysteresis characteristics, frequent changes in the number of readout lines do not occur even if a minute change in the ISO sensitivity occurs. Therefore, it is possible to obtain the effect that the difference in rolling distortion becomes less conspicuous on the display and recording image.

FIG. 12 illustrate the restriction on the amount of change in the number of readout lines of the focus detection pixels. FIG. 12A illustrates a case in which the number of readout lines is greatly changed. FIG. 12B illustrates a case in which the number of readout lines is gradually changed. The time change in output of the imaging element is shown below the vertical synchronization signal VD.

FIG. 12A illustrates a case in which the number of readout lines of the focus detection pixels is greatly increased between frames. In this case, since the slit rolling exposure time of the focus detection pixels suddenly changes, there is a high possibility that changes in image quality will be conspicuous. In contrast, as shown in FIG. 12B, if the number of readout lines is gradually changed, there is a low possibility that changes in image quality will be conspicuous. That is, a sudden change in slit rolling exposure time does not occur due to gradually increasing the number of readout lines between frames, so that the change in image quality becomes less conspicuous. In FIG. 12, a description was given of a restriction on increasing the number of lines when changing the number of readout lines, and a similar restriction is performed if the number of readout lines is reduced. That is, the restriction is imposed by gradually reducing the number of lines at the time of changing the number of readout lines. The system control unit 50 determines the amount of change in the number of readout lines in the case of restricting the change in the number of readout lines between consecutive frames by using one or more of the ISO sensitivity, a temperature, frame rate, object detection information, and the like.

FIG. 13 are schematic diagrams that explain the readout of the focus detection pixels if an object region is detected in a captured image. FIG. 13A illustrates a region of the object 1300 within the shooting angle of view and a focus detection frame 1301 arranged in the vicinity of the object region. The system control unit 50 processes the captured image data from the imaging unit 22 by the image processing unit 24, and performs a detection process of a main object. The focus detection is performed in the vicinity of the main object region, and the system control unit 50 arranges the focus detection frame 1301 in the vicinity of the region of the object 1300 and performs control of the focus detection process. The detected result of the main object is output to serve as object coordinates in the captured image.

FIG. 13B is a timing chart that explains the readout timing of the imaging element. The vertical synchronizing signal VD, and the output SensorOut of the imaging element are shown. In FIG. 13B, readout lines of focus detection pixels are distinguished by gray portions. In the imaging unit 22, the readout lines of the focus detection pixels in the imaging element are set as a line in the focus detection region arranged in the vicinity of the main object region. The system control unit 50 performs a focus detection process on the main object and performs control of moving the focus lens to an in-focus position. If the position of the main object region is changed, the setting of the readout lines of the focus detection pixels is changed with respect to the imaging unit 22 in accordance with the coordinates of the main object. The setting of the readout lines of the focus detection pixels is performed by a communication from the system control unit 50 to the imaging unit 22.

If the shutter speed or the ISO sensitivity is changed when the main object has been detected, in other words, if the accumulation time of the imaging element or the S/N ratio of the image signal has changed, a process that changes the number of readout lines of the focus detection pixels in the vicinity of the region of the object 1300 is performed. According to the present embodiment, it is possible to suppress deterioration in focus detection accuracy irrespective of object luminance and a sensitivity setting of the imaging element, and without an increase of power consumption.

Second Embodiment

Next, a second embodiment of the present invention will be described. In the first embodiment, an example has been described in which the A+B image signal added at the FD section is read out after reading out the A image signal if the focus detection image is read out. In the present embodiment, an example will be described in which the B image signal is read out after reading out the A image signal in the imaging unit, and then the A image signal and the B image signal are added. Note that descriptions of the components the same as those of the first embodiment will be omitted and differences will be described.

FIG. 14 illustrates readout timing of the imaging element, where a vertical synchronizing signal VD and a horizontal synchronizing signal HD are shown. The signal readout of pixels is performed for each line in synchronism with HD based on a reference signal of frame readout start in synchronization with VD. The readout lines of the focus detection pixels are readout lines of the A image signal and the B image signal to be used for focus detection. During the HD period of time, the readout of the A+B image signal is performed in the regular line. In the readout line of the focus detection pixels, only the A image signal is output first, and if the signal readout of all the horizontal pixels is completed, only the B image signal is output continuously. If the signal readout ends in a line for which the signal readout of the focus detection pixel has been designated, the process returns to the signal readout of the regular line and the signal readout of the entire screen is performed.

The image processing unit 24 adds the image signals read out from the imaging unit 22 and the focus detection unit 23, that is, the A image signal and the B image signal, as shown in the following formula (2), and generates data of display and recording image.

Addition image signal of A image and B image=A image signal+B image signal   (2)

In contrast, in the focus detection process, the A image signal and the B image signal are used as they are, and the correlation calculation for both signals is performed and the defocus amount is calculated.

According to the present embodiment, the process that changes the readout lines of the focus detection pixels is performed if the B image signal is read out after reading out the A image signal and the addition process of the A image signal and the B image signal is performed, and as a result, the effect the same as the first embodiment is obtained.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-224203, filed Nov. 17, 2016, which is hereby incorporated by reference wherein in its entirety.

The invention claimed is:

1. An imaging apparatus comprising:
an imaging element configured to include a plurality of microlenses, each with a corresponding first photoelectric converter and a corresponding second photoelectric converter, each of the first photoelectric converter and the second photoelectric converter being configured to convert an optical image of an object formed by an imaging optical system into an image signal, wherein the imaging element outputs (a) a first signal corresponding to the first photoelectric converter and the second photoelectric converter or (b) the first signal and a second signal, the second signal corresponding to either one of the first photoelectric converter unit or the second photoelectric converter;
a focus detection unit configured to perform focus detection based on the first signal and the second signal; and
a control unit configured to (a) perform control of changing a readout line that reads the first signal and the second signal in a region where the focus detection unit performs the focus detection and (b) perform control of the focus adjustment of the imaging optical system by using the image signal obtained from the readout line,
wherein (1) if an exposure time is a first time, the control unit carries out control to increase a number of lines for reading the first signal and the second signal and to decrease a number of lines for reading the first signal and not reading the second signal, as compared with a case where the exposure time is a second time that is shorter than the first time, or (2) if a sensitivity is a first sensitivity, the control unit carries out control to increase the number of lines for reading the first signal and the second signal and to decrease the number of lines for reading the first signal and not reading the second signal, as compared with a case where the sensitivity is a second sensitivity that is lower than the first sensitivity.

2. The imaging apparatus according to claim 1, wherein the imaging element outputs the second signal in the readout line before outputting the first signal.

3. The imaging apparatus according to claim 1, wherein the first signal and the second signal are added in adjacent lines in the vertical direction of a screen, respectively.

4. The imaging apparatus according to claim 1, wherein the control unit performs control of shortening a standby period of time of the imaging element according to increase in a number of the readout lines.

5. The imaging apparatus according to claim 1, wherein the control unit performs control of extending a frame period of time of a moving image according to increase in a number of the readout lines.

6. The imaging apparatus according to claim 1, wherein the control unit performs control of extending a frame period of time so as to encompass a readout time corresponding to increase in a number of the readout lines in a mode in which captured images are sequentially displayed.

7. The imaging apparatus according to claim 1, wherein, the control unit restricts an amount of change of a number of lines between consecutive frames according to change of a number of readout lines.

8. The imaging apparatus according to claim 1, wherein the control unit performs a process of detecting an object region of a captured image and performs control of changing the readout line according to change of the position of the object region.

9. An imaging apparatus comprising:
an imaging element configured to have include a plurality of microlenses, each with a corresponding first photoelectric converter and a corresponding second photoelectric converter, each of the first photoelectric converter and the second photoelectric converter being configured to convert an optical image of an object formed by an imaging optical system into an image signal, wherein the imaging element outputs (a) a first signal corresponding to the first photoelectric converter and the second photoelectric converter or (b) the first signal and a second signal, the second signal corresponding to either one of the first photoelectric converter unit or the second photoelectric converter;
a focus detection unit configured to perform focus detection based on the first signal and the second signal; and
a control unit configured to (a) perform control of extending a frame period of time of a moving image with respect to a region where the focus detection unit performs the focus detection and (b) perform control of the focus adjustment of the imaging optical system,
wherein (1) if an exposure time is a first time, the control unit carries out control to extend the frame period of time of the moving image, as compared with a case where the exposure time is a second time that is shorter than the first time, or (2) if a sensitivity is a first sensitivity, the control unit carries out control to extend the frame period of time of the moving image, as compared with a case where the sensitivity is a second sensitivity that is lower than the first sensitivity.

10. The imaging apparatus according to claim 9, wherein the first signal and the second signal are added in adjacent lines in the vertical direction of the screen, respectively.

11. The imaging apparatus according to claim 9, wherein the control unit restricts an amount of change of the frame period of time of the moving image between consecutive frames according to extension of the frame period of time of the moving image.

12. A control method executed by an imaging apparatus including an imaging element, the imaging element including a plurality of microlenses, each with a corresponding first photoelectric converter and a corresponding second photoelectric converter, each of the first photoelectric converter and the second photoelectric converter being configured to convert an optical image of an object formed by an imaging optical system into an image signal, wherein the imaging element outputs (a) a first signal corresponding to the first photoelectric converter and the second photoelectric converter or (b) the first signal and a second signal, the second signal corresponding to either of the first photoelectric converter or the second photoelectric converter, the method comprising:
performing focus detection based on the first signal and the second signal; and
performing (a) control of changing a readout line that reads the first signal and the second signal in a region where the focus detection is performed, and (b) control of the focus adjustment of the imaging optical system, wherein (1) if an exposure time is a first time, control is carried out to increase a number of lines for reading the first signal and the second signal and to decrease a number of lines for reading the first signal and not reading the second signal, as compared with a case where the exposure time is a second time that is shorter than the first time, or (2) if a sensitivity is a first sensitivity, control is carried to increase the number of lines for reading the first signal and the second signal and to decrease the number of lines for reading the first signal and not reading the second signal, as compared with a case where the sensitivity is a second sensitivity that is lower than the first sensitivity.

* * * * *